United States Patent Office 3,840,492
Patented Oct. 8, 1974

3,840,492
FLAME RETARDANT ORGANOPOLYSILOXANE COMPOSITION
Ronald L. Smith, El Dorado, Ark., and Bruce D. Karstedt, Charlotte, N.C., assignors to General Electric Company
No Drawing. Filed Feb. 10, 1972, Ser. No. 225,293
Int. Cl. C08g 51/04
U.S. Cl. 260—37 SB          12 Claims

ABSTRACT OF THE DISCLOSURE

Composition convertible to the solid cured elastic state upon exposure to moisture comprising certain room temperature vulcanizing silicone elastomers and an effective flame retardant amount of a platinum containing compound.

BACKGROUND OF THE INVENTION

This invention relates to organopolysiloxanes which are capable of curing at room temperature to rubbery materials and in particular this invention is directed to materials commonly referred to as room temperature vulcanizing silicones which cure at room temperature upon exposure to moisture commonly present in the atmosphere.

These room temperature vulcanizing silicone rubbers are known in the art and are described, among other places, in Pats. 3,035,016, 3,077,465, 3,105,061, 3,133,891, and 3,296,161. These materials generally are prepared by mixing an organopolysiloxane, which is primarily a diorganopolysiloxane, containing silicon-bonded hydroxyl or alkoxy groups with an organo silicate or with an organotriacyloxysilane either in the presence or absence of added fillers and added vulcanization accelerators.

However, the manufacture of room temperature vulcanizing silicone elastomers which are flame retardant is quite difficult and has presented a continuing problem for the silicone industry. Finding an effective flame retardant for such compositions is difficult, for instance, since the alkyltriacyloxysilanes which may be present, deleteriously effect the flame retardant properties of various flame retardants which have been employed in heat curable siloxanes. Accordingly, the presence of the alkyltriacyloxysilanes greatly reduces the effectiveness of such flame retardants. Moreover, various flame retardants previously employed adversely interfere with the cure mechanism.

Various attempts to solve this flame retardancy problem have been suggested. However, such prior attempts have not been completely satisfactory. In particular, various prior attempts to impart flame retardancy to room temperature vulcanizing silicone elastomers are extremely expensive. In addition, such prior attempts generally require at least two different additives to provide flame retardancy.

It is an object of the present invention to provide an improved room temperature vulcanizing silicone elastomer.

It is a further object of the present invention to provide a room temperature vulcanizing silicone rubber of improved flame retardancy.

The present invention makes it possible to obtain flame retardant room temperature vulcanizing silicone compositions with only one flame retardant additive.

SUMMARY OF INVENTION

The compositions of the present invention are convertible to the solid cured elastic state upon exposure to moisture and comprise:

(A) A substantially liquid organopolysiloxane having a viscosity of from 200 to 500,000 centistokes containing an average of from 1.85 to 2.02 silicon-bonded organic groups per silicon atom, containing from 0.02 to 2.0% by weight silicon-bonded hydroxyl and/or alkoxy groups, and containing at least about 1% by weight of a silicon-bonded organic radical selected from the group of aryl, alkaryl, aralkyl, and halogenated derivatives thereof;

(B) An organotriacyloxysilane having the formula:

$$R''Si(OY)_3,$$

wherein R'' is selected from the class of monovalent hydrocarbon radicals, halogenated monovalent hydrocarbon radicals, and cyanoalkyl radical, and Y is a saturated aliphatic monoacyl radical of a carboxylic acid, or an organosilicate having the formula:

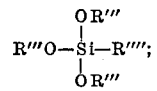

wherein each R''' individually is selected from the class of aliphatic hydrocarbon groups and halogen-substituted derivatives thereof, and R'''' is a member selected from the class of alkyl, aryl, aralkyl, alkaryl, alkoxy, and aryloxy groups and halogenated derivatives of the aforesaid alkyl, aryl, aralkyl, alkaryl, alkoxy, and aryloxy groups; or liquid partial hydrolysis products of the above-defined organosilicates; and (C) An effective flame retardant amount of a platinum containing material.

DESCRIPTION OF THE PREFERRED EMBODIMENTS

The liquid organopolysiloxanes employed in the practice of the present invention as the "base polymer" for the room temperature vulcanizing silicone rubbers of the invention can comprise a single species or a plurality of species. These base polymers are liquids which have a viscosity of from about 200 to 500,000 centistokes at 25° C., which contain an average of from about 1.85 to 2.02 silicon-bonded organic radicals per silicon atom, with the organic radicals being selected from the class consisting of monovalent hydrocarbon radicals, halogenated monovalent hydrocarbon radicals and cyanoalkyl radicals, with the organic radicals being attached to silicon through silicon-carbon linkages and with there being present in the base polymer from about 0.02 to 2.0% by weight silicon-bonded hydroxyl groups or alkoxy groups. In addition, the base polymers employed in the present invention contain at least about 1% by weight of a silicon-bonded aryl, alkaryl, aralkyl, or halogenated derivative of said aryl, alkaryl, and aralkyl group. In many cases, the base polymers employed in the present invention contain at least about 0.03 weight percent of a silicon-bonded alkenyl group such as a vinyl or allyl group.

Generally speaking these compositions comprise primarily diorganosiloxane units, but can also contain minor amounts of monoorganosiloxane units and triorganosiloxane units. One particularly useful type of liquid organopolysiloxane base polymer is the material having the formula:

(1)
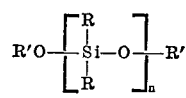

where R is a member selected from the class consisting of monovalent hydrocarbon radicals, halogenated monovalent hydrocarbon radicals and cyanoalkyl radicals and n has a value of at least 5, e.g., from about 20 to 3,000 or more, and R' is selected from the group of hydrogen and alkyl. The liquid organopolysiloxane within the scope of formula (1) can comprise a variety of molecules of different molecular weights and of different R and R' substituents so long as the average formula of the reaction mixture falls within the scope of formula (1).

In addition to the linear silanol or alkoxy chain-stopped diorganopolysiloxanes of formula (1), the base polymer can also contain some molecules containing linear diorganosiloxane chains which are terminated at one end with triorganosiloxane units having the formula:

(2) $(R)_3SiO_{0.5}$ with the other end of the chains being terminated by alkoxy or silanol groups, where R is as previously defined. The polymer chains can also contain some molecules containing monoorganosiloxane units having the formula:

(3) $RSiO_{1.5}$ where R is as previously defined. In any case, it is necessary that the fluid organopolysiloxane base polymer have a viscosity in the range of from about 200 to 500,000 centistokes as previously described and preferably in the range of from about 2,000 to 50,000 centistokes at 25° C., with the amount of silicon-bonded hydroxyl and/or alkoxy groups being equal to at least about from 0.02 to 2.0% by weight. It is also necessary that the fluid organopolysiloxane base polymer contains at least about 1 weight percent of silicon-bonded aryl and/or alkaryl and/or aralkyl radical and/or halogenated derivatives of said aryl, alkaryl, and aralkyl radicals. Preferably the base polymer contains at least about 1 weight percent of silicon-bonded phenyl groups. Methods of preparation suitable for obtaining these various liquid organopolysiloxanes are well known in the art and need not be described in the present invention.

The presence of the aryl, alkaryl, aralkyl groups or halogenated derivatives thereof in amounts of at least about 1 weight percent makes it possible to obtain excellent flame compositions by the incorporation of extremely small amounts of the platinum-containing material. For instance, it was surprisingly discovered that less than 3 p.p.m. of platinum metal provided materials possessing exceptionally high flame retardant characteristics. As will be demonstrated hereinbelow, even if the specified aromatic groups such as the phenyl are replaced with an alkenyl group, the flame retardancy of such compositions including the platinum containing material will be vastly inferior to the flame retardant properties of the compositions of the present invention.

Illustrative of the groups for R of the fluid organopolysiloxane are, for example, alkyl radicals, e.g., methyl, ethyl, propyl, butyl, octyl, etc., radicals; aryl radicals, e.g., phenyl, naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenated monovalent hydrocarbon radicals, such as, for example, chloromethyl, alpha-chloroethyl, beta-chloroethyl, chlorophenyl, dibromophenyl, trifluoromethylphenyl, trifluoromethylpropyl, etc., radicals; as well as cyanoalkyl radicals, such as, for example, cyanomethyl, beta-cyanoethyl, beta-cyanopropyl, gamma-cyanopropyl, omega-cyanobutyl, etc., radicals.

The preferred organo radicals represented by R in the fluid organopolysiloxanes employed in the practice of the present invention are phenyl, vinyl, and methyl.

R' of the fluid organopolysiloxanes of formula (1) is hydrogen or an alkyl group such as methyl, ethyl, propyl, t-butyl, octyl, hexyl and stearyl. Preferably R' is hydrogen or t-butyl.

Organotriacyloxysilanes which may be employed in admixture with the organopolysiloxanes of formula (1) to provide the room temperature vulcanizing elastomers have the formula:

(4) $R''Si(OY)_3$ where R" is a member selected from the class consisting of monovalent hydrocarbon radicals, halogenated monovalent hydrocarbon radicals, and cyanoalkyl radicals and Y is a saturated aliphatic monoacyl radical of a carboxylic acid.

The R" group of formula (4) is of the same scope as described for the R groups of the fluid organopolysiloxane. Illustrative of the groups previously defined as selected from the class consisting of monovalent hydrocarbon radicals, halogenated monovalent hydrocarbon radicals and cyanoalkyl radicals for R" of the organotriacyloxysilane of formula (4) are, for example, alkyl radicals, e.g., methyl, ethyl, propyl, butyl, octyl, etc., radicals; aryl radicals, e.g., phenyl, naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenated monovalent hydrocarbon radicals, such as, for example, chloromethyl, alpha-chloroethyl, beta-chloroethyl, chlorophenyl, dibromophenyl, trifluoromethylphenyl, trifluoromethylpropyl, etc., radicals; as well as cyanoalkyl radicals, such as, for example, cyanomethyl, beta-cyanoethyl, beta-cyanopropyl, gamma-cyanopropyl, omega-cyanobutyl, etc., radicals.

Preferably R" is a lower alkyl radical, such as methyl, ethyl, propyl, butyl, octyl, etc., or is a simple aryl radical, such as phenyl or tolyl. The acyl radical represented by Y is represented by such groups as formyl, acetyl, propionyl, butyryl, hexoyl, 2-ethylhexoyl, octanoyl, isovaleryl, and stearyl. The preferred Y radical is acetyl. The preferred specific composition within the scope of formula (4) is methyltriacetoxysilane.

The organosilicates which can be employed in the compositions of the present invention are from the class consisting of (1) monomeric organosilicates corresponding to the general formula:

(5)
$$R'''O-\underset{\underset{OR'''}{|}}{\overset{\overset{OR'''}{|}}{Si}}-R''''$$

and (2) liquid partial hydrolysis products of the aforementioned monomeric organosilicates where R''' is a member selected from the class consisting of aliphatic hydrocarbon radicals of up to 10 carbon atoms and halogenated derivatives thereof, and R'''' is a member selected from the class consisting of alkyl radicals, aryl radicals, aralkyl radicals, alkaryl radicals, alkoxy radicals, aryloxy radicals and halogenated derivatives of the aforesaid alkyl, aryl, aralkyl, alkaryl, alkoxy and aryloxy radicals. Preferably R''' is an alkyl radical of 1 to 10 carbon atoms.

Included within the radicals represented by R''' and R'''' in formula (5) can be mentioned, for example, methyl, ethyl, propyl, isopropyl, butyl, amyl, isoamyl, octyl, isooctyl, decyl, dodecyl, beta-chloroethyl, etc. radicals. Also included within the radicals represented by R'''' can be mentioned, for example, ethoxy, propoxy, butoxy, nonoxy, phenyl, tolyl, xylyl, benzyl, phenylethyl, naphthyl, anthracyl, biphenyl, phenoxy, p-bromophenoxy, beta-chloroethoxy, etc. radicals. The halogens, for example, chlorine, bromine, etc., may be attached to any position in the hydrocarbon group and may comprise any number of halogens. When halogen is attached to an alkyl group, in either the R''' or the R'''' radical, it is preferred that the halogen be attached to a carbon atom other than an alpha carbon atom in order to attain improved stability of such halogen-substituted alkyl groups.

Illustrative of preferred monomeric alkyl silicates are compounds corresponding to the general formula:

(6) $(R'''O)_4Si$ where R''' is an aliphatic hydrocarbon group as defined above. In addition to employing the liquid monomeric organic silicates described above in the practice of the present invention, liquid partially hydrolyzed products derived therefrom can also be used. Such hydrolysis products are generally obtained by effecting partial hydrolysis in water of the particular monomeric organosilicate in the presence of small amounts of acid to a point where it is still water insoluble and it is still possible to isolate a liquid, partially hydrolyzed organosilicon compound. Thus, taking as a specific example a controlled partial hydrolysis of ethylorthosilicate, the hydrolysis of the latter may be carried out by adding acids or acid-forming metal salts to the liquid monomeric orthosilicate, for instance, ferric chloride, cupric chloride, aluminum chloride, stannic chloride etc., and thereafter effecting suitable hydrolysis of this mixture of ingredients in water to obtain the two-phase composition from which the water insoluble, partially hydrolyzed alkyl silicate can be readily separated from the aqueous phase and catalyst. The preferred organosilicate is tetraethyl silicate. The room temperature vulcanizing silicone elastomers employed in the present invention are free from silicon-bonded hydrogen.

The platinum-containing material which is used as the flame retardant is in general any of the materials generally utilized as catalysts in SiH-olefin-Si reactions. Among the forms of this platinum are elemental platinum, as shown in U.S. Pat. 2,970,150—Bailey and platinum-on-charcoal, platinum - on - gamma-alumina, platinum-on-silica gel, platinum-on-asbestos, and chloroplatinic acid ($H_2PtCl_6 \cdot 6H_2O$), as mentioned in Pat. 2,823,218—Speier. Further, the platinum-containing material can be selected from those having the formula $(PtCl_2 \cdot olefin)_2$ and $H(PtCl_3 \cdot olefin)$, as described in U.S. Pat. 3,159,601—Ashby. The olefin shown in the previous two formulas can be almost any type of olefin, but is preferably an alkene having from 2 to 8 carbon atoms, a cycloalkene having from 5 to 7 carbon atoms, or styrene, or 2,4,6,8 - tetramethyl - 2,4,6,8 - tetravinylcyclotetrasiloxane. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex $(PtCl_2 \cdot C_3H_6)_2$ described in U.S. Pat. 3,159,662—Ashby.

Still further, the platinum-containing material can be a complex formed from chloroplatinic acid with up to two moles per gram-atom of platinum of a member selected from the class consisting of alcohols having the formula $R^2OH$, ethers having the formula $R^2OR^3$, aldehydes having the formula $R^2CHO$ and mixtures of the above as described and claimed in the application of Harry F. Lamoreaux, Ser. No. 207,076, filed July 2, 1962, and assigned to the same assignee as the present invention. The substituent $R^2$ in the above formula is a member selected from the class consisting of alkyl radicals having at least 4 carbon atoms, alkyl radicals substituted with an aromatic hydrocarbon radical, and alkyl radicals substituted with an aromatic hydrocarbon radical, and alkyl radicals substituted with an $OR^3$ group, where $R^3$ is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to two atoms, at least one of which is a carbon atom and up to one of which is a hydrogen atom.

It is quite surprising that the platinum-containing materials provide excellent flame retardancy in the room temperature vulcanizing silicones of the present invention. For instance, when employing a room temperature vulcanizing composition wherein the base polymer does not contain the requisite amount of aromatic groups such as the phenyl groups, in conjunction with the platinum-containing compound, acceptable flame retardancy was not achieved. In addition, the platinum materials are so effective in achieving flame retardancy in the present compositions that the quantity necessary is small enough to render their use economically feasible.

The relative amounts of the organopolysiloxane base polymer, the organotriacyloxysilane or organosilicate, and the flame retardant compound employed in producing compositions which, upon exposure to moisture, cure to the solid, elastic state, vary within fairly broad limits. Generally, the amount of organotriacyloxysilane of formula (4) or silicate is from about 1.8 to 6.0 parts per 100 parts of the base polymer.

Small, but effective, amounts of the platinum-containing material are sufficient to impart the desired flame retardancy to the silicone rubber. In general, amounts of from 0.2 to 250 parts per million, as platinum, based on the organopolysiloxane base polymer, can be used. Preferably, the amount is from 0.2 to 20 p.p.m., as platinum, based on the organopolysiloxane base polymer. Excellent results have been obtained with amounts less than 3 p.p.m. such as from 0.2 to about 2.6 p.p.m. The platinum-containing material can be employed in amounts greater than 250 parts per million, but, due to the cost of the materials, utilization of greater than 250 parts per million is not preferred as the increased amounts do not provide significant improvement in the flame retardancy of the final material.

The room temperature vulcanizing silicone rubber compositions of the present invention are prepared by simply mixing the liquid organopolysiloxane base polymer with the organotriacyloxysilane or silicate, and the platinum containing flame retardant. Depending upon whether the composition can be used as a one-package and/or a two-package room temperature vulcanizing composition, the components are admixed prior to or at the time of application of the composition. Those skilled in the art can readily ascertain whether a particular formulation is suitable as a one-package and/or a two-package room temperature vulcanizing composition depending primarily upon the particular organotriacyloxysilane or silicate employed.

Since the organotriacyloxysilane and the organosilicate tend to hydrolyze upon exposure to the atmosphere, care is exercised to exclude moisture during the mixing of the several components. Likewise, care should be taken that the mixture of the organopolysiloxane base polymer, the organotriacyloxysilane or organosilicate is maintained under substantially anhydrous conditions if it is desired to store the mixture for an extended period of time in a liquid state prior to conversion of the material to the cured, solid, elastic silicone rubber state. On the other hand, if it is desired to permit the mixture to cure immediately upon addition of the organotriacyloxysilane or silicate to the liquid organopolysiloxane no special precautions need be taken and the two materials can be merely mixed and placed in the form or shape which it is desired for the material to be cured.

The temperature at which the organotriacyloxysilane of formula (4) or silicate is added to the reaction mixture is generally immaterial, with the addition generally being effected at a temperature of from about 20° to 80° C.

Compositions prepared by mixing the flame retardant and the organotriacyloxysilane or silicate with the base polymer can be used without further modification in any sealing, caulking or coating application by merely placing the composition in the desired place and permitting it to cure upon exposure to the moisture present in the atmosphere. Upon exposure of some compositions of the present invention to atmospheric moisture, even after storage for times as long as two years or more, a hard "skin" will form on a composition shortly after exposure and complete cure to the rubbery state will have been effected within about 24 hours, all at room temperature. The time required for the formation of such skin is generally on the order of 30 minutes.

It is often desirable to modify the compositions of the present invention by addition of various materials which act as extenders or which change various properties, such as cure rate, color, or cost. For example, if it is desired to reduce the time required for complete cure by a factor of from about 2 to 5 without affecting the work life of the room temperature vulcanizing composition, the composition can be modified by the incorporation of a minor amount of a carboxylic acid salt of a metal ranging from lead to manganese, inclusive, in the electromotive series of metals. The particular metals included within the scope are lead, tin, nickel, cobalt, iron, cadmium, chromium, zinc, and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, diphenyl lead diformate, dibutyl tin dilactate, dicyclopentyl lead bis-monochloroacetate, dibenzyl lead di-2-pentanoate, diallyl lead di-2-hexanoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc. When the organosilicate is employed, it is preferred to use one of the above-disclosed metal salts.

The amount of the metal salt of the organic carboxylic acid which can be employed in the practice of the present invention is a function of the increased rate of curing desired so that any amount of such salt up to the maximum effective amount for increasing the cure rate can be employed. In general, no particular benefit is derived from employing more than about 5% by weight of such metal salt based on the weight of the organo-polysiloxane base polymer. Preferably, where such metal salt is employed, it is present in an amount equal to from about 0.01% to 2.0% by weight, based on the weight of the base polymer.

The compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, and finely divided silica treated with organosilicon materials, e.g., trimethylchlorosilane, etc. The treatment of silica fillers with organosilicon materials are as described, e.g., in U.S. Pats. 2,938,009—Lucas and 3,004,859—Lichtenwalner. The amount of filler present can vary within wide ranges, from 10 to 300 parts of filler per 100 parts of the base polymer. Preferably, the filler is present in an amount of from 40 to 125 parts per 100 parts of the base polymer. Preferably the filler employed is at about ⅓ silica material and is not alkaline.

In addition to the modification of the compositions of the present invention by the addition of metal salt cure accelerators and fillers, these compositions can also be modified by the incorporation of various stabilizing agents and plasticizers. Moreover, such materials as the dialkoxydiacyloxysilanes set forth in U.S. Pat. 3,296,161 to Kulpa can be employed in the compositions of the present invention. Such dialkoxydiacyloxysilanes have the formula:

(7) $\qquad (R^vO)_2Si(OY)_2$ where $R^v$ is a lower alkyl radical and Y is a saturated aliphatic monoacyl radical of a carboxylic acid.

In formula (7), the group represented by $R^v$ is a lower alkyl radical, by which is meant an alkyl radical containing from 1 to 8 carbon atoms such as, for example, methyl, ethyl, propyl, butyl, t-butyl, hexyl, octyl, 2-ethyl hexyl, etc., radicals. The acyl radical represented by Y is a saturated aliphatic monoacyl radical of a carboxylic acid. Illustrative of the desired radical are those in which the acyl radical contains up to 4 carbon atoms, such as formyl, acetyl, propionyl, and butyryl radicals. However, the acyl groups can also be represented by groups such as hexoyl, 2-ethyl hexoyl, octanoyl, isovaleryl, and stearyl. Illustrative of specific silicones within formula (7) can be mentioned for example, dimethyldiformoxysilane, diethoxydiformoxysilane, dipropionoxydiacetoxysilane, di-t-butoxydiacetoxysilane, di-2-ethylhexoxydioctanolsilane, etc.

Where the compositions of the present invention contain components other than the organotriacyloxysilane of formula (4), the organosilicate, the flame retardant, and the base polymer, the various ingredients can be added in any desired order. However, for ease of manufacturing it is often convenient to form a blend or mixture of all of the components of the room temperature vulcanizing organopolysiloxane except the dialkoxydiacyloxysilane, if present, and the organosilicate or the organotriacyloxysilane, to then remove moisture from the resulting mixture by maintaining the mixture under vacuum, and thereafter to add the dialkoxydiacyloxysilane, if desired, and the organosilicate or the organotriacyloxysilane prior to packaging of the compositions in containers protected from moisture. In addition to more conventional containers for bulk amounts of these materials, the materials can be packages for convenient usage in caulking cartridges, squeeze tubes, and the like. Of course, where it is desired to permit the curable composition to cure immediately upon formation, no special precautions need be taken during the addition of the dialkoxydiacyloxysilane, if added, and the organosilicate or the organotriacyloxysilane and the mixture is allowed to cure immediately after the addition in the desired shape.

The room temperature vulcanizing silicone rubber compositions of the present invention are particularly adapted for caulking and sealing applications where flame retardancy is important.

In order to evaluate the flame retardant properties of the silicone rubber compositions described in the examples, a test was employed which consisted of suspending a cured strip of the silicone rubber, having dimensions of 1.0 in. by 6 in. by 0.075 in. from a metal wire in a glass chimney in a draft-free atmosphere over a blue flame (approximately 500° C.) in such a manner that the tip of this strip is suspended 1 inch into the flame. The strip is held in the flame for a period of 20 seconds, at which time the flame is removed and the time required for complete extinguishment of the flame and glow is measured. The time is recorded as the "burning time," in seconds. The test strip is then freed of loose ash and weighed to determine the "percent consumed" by the fire. The compositions are cured by being exposed to the atmosphere for four days.

The following non-limiting examples are given wherein aall parts are by weight unless the contrary is set forth:

EXAMPLE 1

A liquid base polymer is prepared by mixing 75 parts of a silanol chain-stopped linear methylvinylpolysiloxane containing 25 weight percent vinyl groups, a viscosity of 300 centistokes at 25° C., and containing 0.2% by weight silicon-bonded hydroxyl groups; 100 parts of a fluid methylphenylpolysiloxane having a viscosity of about 10,000 centistokes, containing 0.15 weight percent silicon-bonded hydroxyl groups and containing 6.4% by weight phenyl groups; and 15 parts of a silanol chain-stopped linear methylphenylpolysiloxane containing 10% by weight phenyl groups and 1% by weight silicon-bonded hydroxyl groups and having a viscosity of 300 centistokes at 25° C. To this base polymer are added 6 parts of platinum in the form of a methyl platinum vinyl complex obtained by complexing chloroplatinic acid with 2,4,6,8-tetramethyl-2,4,6,8-tetravinylcyclotetrasiloxane; 60 parts of 5 micron crushed quartz, and 20 parts of a dimethyl siloxy treated fumed silica commercially available under the trade designation Cabosil MS-7 from Cabot Corp., and 4 parts of a catalyst mixture consisting of 19.9% by weight di-t-butoxy diacetoxysilane, 79.5% by weight of methyl triacetoxysilane, and 0.6% by weight dibutyl tin dilaurate. This composition is cured by being exposed to the atmosphere for 4 days. It burns for only 22 seconds and 3% is consumed in the flame retardancy test.

EXAMPLE 2

Example 1 is repeated except that it does not contain the platinum-containing material. This material is cured by being exposed to the atmosphere for about 4 days. It burns for 32 seconds and 10% is consumed in the flame retardancy test.

EXAMPLE 3

Example 1 is repeated except that the 6 p.p.m. of platinum are replaced with 2 parts of CuO. This material is cured by being exposed to the atmosphere for 4 days. It burns for 82 seconds and is 100% consumed in the flame retardancy test.

A comparison of Examples 1-3 clearly demonstrates the effectiveness of employing the platinum-containing compounds of the present invention. Moreover, a comparison of these examples clearly shows that other suggested flame retardant additives actually adversely affect the flame retardant properties of the composition.

EXAMPLE 4

A liquid base polymer is prepared by mixing 20 parts of a vinyl stopped silanol chain-stopped dimethyl polysiloxane containing 0.2% by weight of vinyl groups, 0.1 weight percent silicon-bonded hydroxyl groups, and having a viscosity of 10,000 centistokes at 25° C., 100 parts of a silanol chain-stopped methylphenylpolysiloxane having a viscosity of about 10,000 centistokes at 25° C., containing 2.6% phenyl groups, and 0.17 weight percent silicon-bonded hydroxy groups; and 18 parts of a silanol chain-stopped diphenyl polysiloxane equilibrated with a dimethyl tetramer containing 13% by weight phenyl groups and 0.5% by weight silicon-bonded hydroxyl groups, and having a viscosity of about 200 centistokes at 25° C. To this base polymer are added 4.7 p.p.m. of platinum employing octylalcohol solution of chloroplatinic acid, 24 parts of a dimethyl siloxy treated fumed silica commercially available under the trade designation Cabosil MS-7, and 4 parts of a catalyst mixture consisting of 19.9% by weight di-t-butoxy diacetoxysilane, 79.5% by weight of methyl triacetoxysilane and 0.6% by weight of dibutyl tin dilaurate. The platinum is obtained by dissolving 1 mole of $H_2PtCl_6 \cdot 6H_2O$ in 7 moles of octyl alcohol. This platinum-alcohol solution is maintained at a temperature of 75°-80° and a pressure of approximately 15 to 20 mm. for 60 hours while the ratio of chlorine to platinum is reduced to 2 atoms of chlorine per atom of platinum. The composition is cured by being exposed to the atmosphere for 4 days. It burns for 70 seconds and is 7% consumed in the flame retardancy test.

EXAMPLE 5

A liquid base polymer is prepared by mixing 20 parts of a vinyl stopped on silanol chain-stopped dimethyl polysiloxane containing 0.2% by weight vinyl groups, and 0.1% by weight of silicon-bonded hydroxyl groups, and a viscosity of 10,000 centistokes at 25° C.; 100 parts of a silanol chain-stopped fluid methylphenyl organopolysiloxane having a viscosity of about 10,000 centistokes at 25° C., 8.5% by weight of phenyl groups, and containing 0.15% by weight silicon-bonded hydroxyl groups, and 18 parts of a diphenyl polysiloxane equilibrated with dimethyl tetramer, and having a phenyl content of 13% by weight, 0.5% by weight silicon-bonded hydroxyl groups, and a viscosity of 200 centistokes at 25° C. To this base polymer are added 2.6 p.p.m. of platinum metal in the form of a methyl platinum vinyl complex obtained by complexing chloroplatinic acid with 2,4,6,8,-tetramethyl-2,4,6,8,-tetravinyl-cyclotetrasiloxane; 48 parts of 5 micron ground quartz available commerically as Minusil, 24 parts of a dimethyl siloxy treated fumed silica (Cabosil MS-7), and 4 parts of the same catalyst as employed in Example 4. The composition is cured by being exposed to the atmosphere for 4 days. It burns for 36 seconds and is 4.6% consumed in the flame retardancy test.

EXAMPLE 6

Example 5 is repeated except that the 100 parts of silanol chain-stopped methylphenylpolysiloxane containing 8.5% phenyl groups is replaced with 100 parts of a silanol chain-stopped methylphenylpolysiloxane having 3.6 weight percent phenyl groups, .017 weight percent silicon-bonded hydroxyl groups, and a viscosity of 10,000 centistokes at 25° C. This material is cured by being exposed to the atmosphere for 4 days. It burns for 33 seconds and is 3.7% consumed in the flame retardancy test.

EXAMPLE 7

Example 5 is repeated except that the 100 parts of the silanol chain-stopped polymer containing, 8.5% phenyl groups is replaced with 100 parts of a silanol chain-stopped methylphenylpolysiloxane polymer containing 10% phenyl groups, containing 0.15 weight percent silicon-bonded hydroxyl groups, and a viscosity of 10,000 centistokes at 25° C. The material is cured by being exposed to the atmosphere for 4 days. It burns for 26 seconds and is 2.7% consumed in the flame retardancy test.

EXAMPLE 8

Example 5 is repeated except that the 100 parts of silanol chain-stopped polysiloxane containing 8.5% phenyl groups is replaced with 100 parts of silanol chain-stopped methylphenylpolysiloxane containing 2% phenyl groups, containing 0.15 weight percent silicon-bonded hydroxyl groups, and a viscosity of 10,000 centistokes at 25° C. This material is cured by being exposed to the atmosphere for 4 days. It burns for 53 seconds and is 5.3% consumed in the flame retardancy test.

EXAMPLE 9

Example 5 is repeated except that the 100 parts of silanol chain-stopped polysiloxane containing 8.5% phenyl groups are replaced with 100 parts of a silanol chain-stopped methylphenylpolysiloxane containing 3% phenyl groups, containing 0.1 weight percent silicon-bonded hydroxyl groups, and a viscosity of 10,000 centistokes at 25° C. This material is cured by being exposed to the atmosphere for 4 days. It burns for 35 seconds and is 3.1% consumed.

EXAMPLE 10

Example 7 is repeated except that the 2.6 p.p.m. of platinum in the form of methyl platinum vinyl complex is replaced with 5.2 p.p.m. of platinum added as an octyl-alcohol solution of chloroplatinic acid is described in Example 4. The material is cured by being exposed to the atmosphere for 4 days. It burns for 41 seconds and is 3.8% consumed in the flame retardancy test.

COMPARISON EXAMPLE 11

To 100 parts of a silanol chain-stopped linear methyl-vinylpolysiloxane containing 1.5% vinyl groups, .2% silicon-bonded hydroxyl groups, and having a viscosity of 10,000 centistokes at 25° C. are added 2.3 p.p.m. as platinum in the form of a octylalcohol solution of chloroplatinic acid, 4 parts of the catalyst system employed in Example 4, 20 parts of a dimethyl siloxy treated fused silica (Cabosil MS-7), and 15 parts of a fluid methylpolysiloxane containing 1.9 weight percent silicon-bonded hydroxyl groups and a viscosity of 1 centistoke at 25° C. This material is cured by being exposed to the atmosphere for 4 days. It burns for 142 seconds and is 50.2% consumed in the flame retardancy test.

A comparison of Example 11 with Examples 1 and 4–10 illustrates the importance of employing a base polymer within the scope of the present invention in order to provide flame retardant compositions.

What is claimed is:

1. A composition stable under anhydrous conditions and convertible to the solid cured elastic state upon exposure to moisture, and which in a cured state exhibits improved flame-retardant properties, comprising:
   (A) a substantially liquid organopolysiloxane having a viscosity of from about 200 to 500,000 centistokes at 25° C., containing an average of from 1.85 to 2.02 of Si—C bonded organic groups per silicon atom, containing 0.02 to 2.0% silicon-bonded hydroxyl or silicon-bonded alkoxy groups, and containing at least about 1.0% by weight of silicon-bonded member selected from aryl, alkaryl, aralkyl, and halogenated derivatives thereof;
   (B) a member selected from the group of:
     (1) organotriacyloxysilane having the formula:

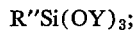

wherein R″ is selected from the class of monovalent hydrocarbon radicals, halogenated monovalent hydrocarbon radicals, and organoalkyl radicals, and Y is a saturated aliphatic monoacyl radical of a carboxylic acid;
     (2) a monomeric organosilicate having the formula:

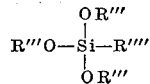

wherein each R‴ individually is a member selected from the class of aliphatic hydrocarbon groups and halogen-substituted derivatives thereof and R″″ is a member selected from the class of alkyl, aryl, aralkyl, alkaryl, alkoxy, and aryloxy groups and halogenated derivatives of the aforesaid alkyl, aryl, aralkyl, alkaryl, alkoxy, and aryloxy groups; and
     (3) liquid partial hydrolysis products of the monomeric organosilicate (2); and
   (C) an effective flame retardant amount of a platinum containing material.

2. The cured product of claim 1.

3. The composition of claim 1 which further contains from about 10 to about 300 parts per 100 parts of base polymer of a filler.

4. The composition of claim 3 wherein said filler contains silica.

5. The composition of claim 3 wherein said filler is fumed silica.

6. The composition of claim 3 wherein said filler is fumed silica and ground quartz.

7. The composition of claim 1 wherein from 0.2 to 250 parts per million of platinum are provided.

8. The composition of claim 1 wherein from 0.2 to 20 parts per million of platinum are provided.

9. The composition of claim 1 wherein (A) is present in an amount of 100 parts by weight, and (B) is present in an amount of from about 1.8 to about 6 parts by weight.

10. The composition of claim 1 wherein (B) is an organotriacyloxysilane.

11. The composition of claim 1 wherein said liquid organopolysiloxane contains at least about 1 weight percent of silicon-bonded phenyl groups.

12. The composition of claim 1 wherein said liquid organopolysiloxane contains at least about 0.03 weight percent of silicon-bonded vinyl groups.

References Cited
UNITED STATES PATENTS

| | | | |
|---|---|---|---|
| 3,133,891 | 5/1964 | Ceyzeriat | 260—37 SB X |
| 3,296,161 | 1/1967 | Kulpa | 260—46.5 G X |
| 3,514,424 | 5/1970 | Noble et al. | 260—37 SB |
| 3,652,488 | 3/1972 | Harder | 260—37 SB |
| 3,318,935 | 5/1967 | Sporck | 260—37 SB X |
| 3,734,881 | 5/1973 | Shingledecker | 260—37 SB |

LEWIS T. JACOBS, Primary Examiner

U.S. Cl. X.R.

260—46.5 G